United States Patent [19]

Hendrickson et al.

[11] 3,980,745

[45] Sept. 14, 1976

[54] BRIQUETTE MOLD POCKET CONFIGURATION

[75] Inventors: Luther G. Hendrickson, Churchill Borough, Allegheny County; Dino Ravasio, McKeesport, both of Pa.

[73] Assignee: United States Steel Corporation, Pittsburgh, Pa.

[22] Filed: Dec. 4, 1974

[21] Appl. No.: 529,424

Related U.S. Application Data

[62] Division of Ser. No. 483,997, June 28, 1974, Pat. No. 3,883,110.

[52] U.S. Cl. ................................ 264/109; 264/111; 264/125

[51] Int. Cl.[2] ........................ B29F 5/00; B22F 3/02; B22F 3/12

[58] Field of Search .... 264/109, 125, 111, DIG. 25, 264/332; 425/194, 237, 78, 363, 471; 249/187 R

[56] References Cited

UNITED STATES PATENTS

| | | | |
|---|---|---|---|
| 2,958,902 | 11/1960 | Decker et al. | 425/237 |
| 2,958,903 | 11/1960 | Decker | 425/195 |
| 3,143,769 | 8/1964 | Komarek et al. | 425/237 |
| 3,231,649 | 1/1966 | Pfeiffer | 264/109 |

FOREIGN PATENTS OR APPLICATIONS

| | | | |
|---|---|---|---|
| 1,153,311 | 8/1963 | Germany | 264/109 |

*Primary Examiner*—Willard E. Hoag

*Attorney, Agent, or Firm*—William L. Krayer

[57] ABSTRACT

The mold faces of opposing briquetting rolls are arranged in V-shaped rows of rhomboid mold pockets.

1 Claim, 4 Drawing Figures

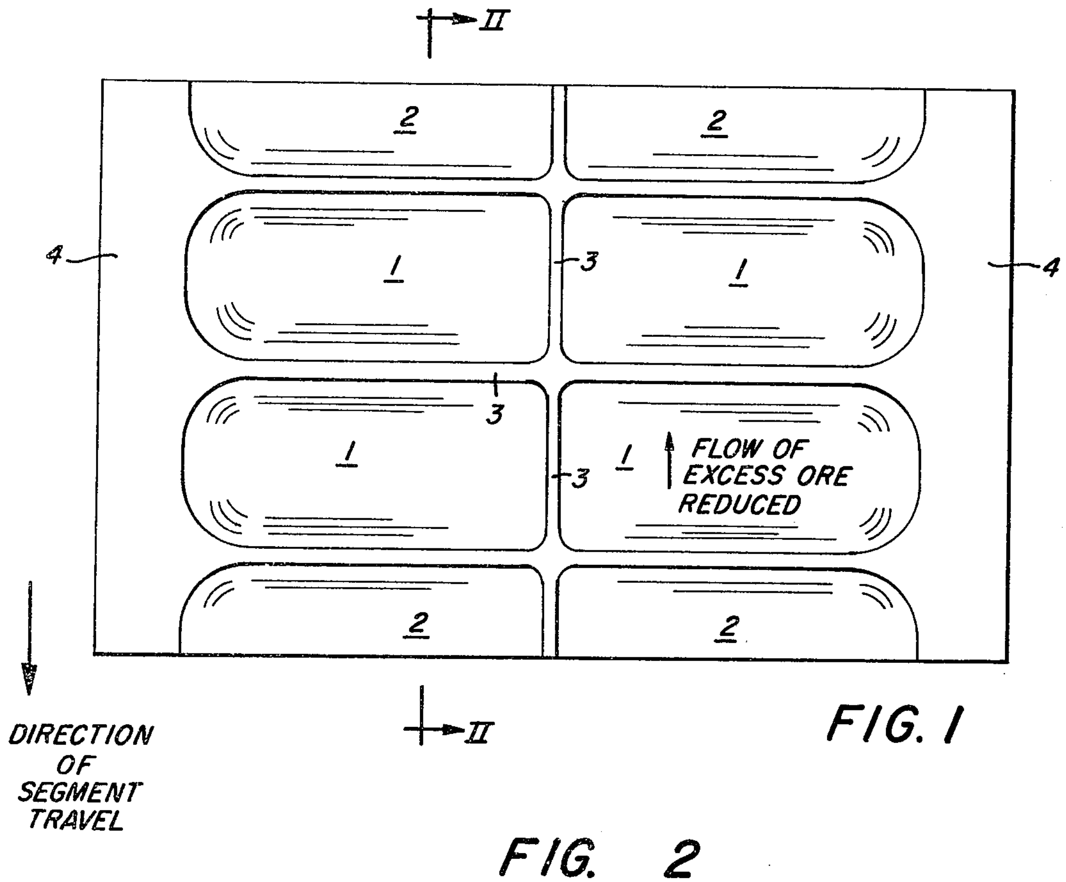
FIG. 1
FIG. 2
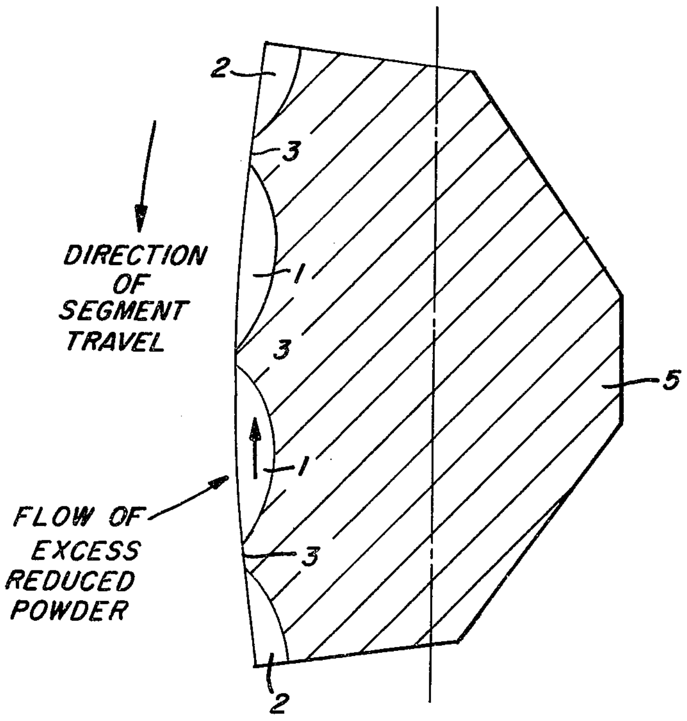

BRIQUETTE MOLD POCKET CONFIGURATION

This is a division of application Ser. No. 483,997, filed June 28, 1974 and now U.S. Pt. No. 3,883,110.

BACKGROUND OF THE INVENTION

This invention relates to an improved pocket design for removable segments used in roll-type briquetting presses.

A conventional roll-type briquetting press includes a pair of power-driven rolls which are journaled on parallel axes, and whose circumferential faces contain a series of mating cavities. These mating cavities are contained in the removable segments that form the circumferential face of the briquetting roll. The rolls are usually held together by hydraulic pressure devices, whereby as they rotate, loose material fed between them is compacted within the cavities. For example, partially reduced particulate iron are may be briquetted at temperatures as high as 1350°F and under loads as great as 100,000 pounds per inch of effective roll width.

Difficulties have been encountered, however, in that the particulate reduced ore tends to flow at a significantly greater rate at the center of the face of the roll than it does at the outside of the face, i.e., near the stationary check plate usually employed to retain the ore in the area between rolls. One of the undesirable results of the uneven flow is an uneven distribution of density in the briquettes, which leads to a higher rate of physical degradation and a greater tendency to reoxidize.

The object of the present invention is to create an improved design for the cavities in the briquette-roll segments, which will provide a better flow of particulates from the center of the roll face to the outside, and thus produce a briquette with more uniform density.

Prior to the present invention, it has been known to employ briquetting rolls with angular cavities. See, for example, Decker et al. U.S. Pat. No. 2,958,902. The configuration shown in Decker, however, which places the mold segment at an angle carried across the entire face of the roll, is not able to create a flow of material towards both sides of the mold face as ours is.

SUMMRY OF THE INVENTION

We have designed our mold cavities in a rhomboid shape and have distributed them in rows of V's across the face of the roll. Thus, some of the material which ordinarily would be compacted under great pressure at the point of the V will find paths of less resistance upward and outward on both sides thereof. Our invention includes a mold segment for use in a roll briquette machine comprising a body portion adapted for inclusion on the periphery of a mold roll, and a plurality of mold pockets arranged in a V-formation extending from a central vertical land area. Our invention will be further described with respect to the accompanying drawings.

In the drawings:

FIG. 1 is a top plan or face view of a conventionally designed briquette roll segment.

FIG. 2 is a vertical section view of the conventional briquette roll segment shown in FIG. 1, indicating the direction of segment travel.

Figure 4:
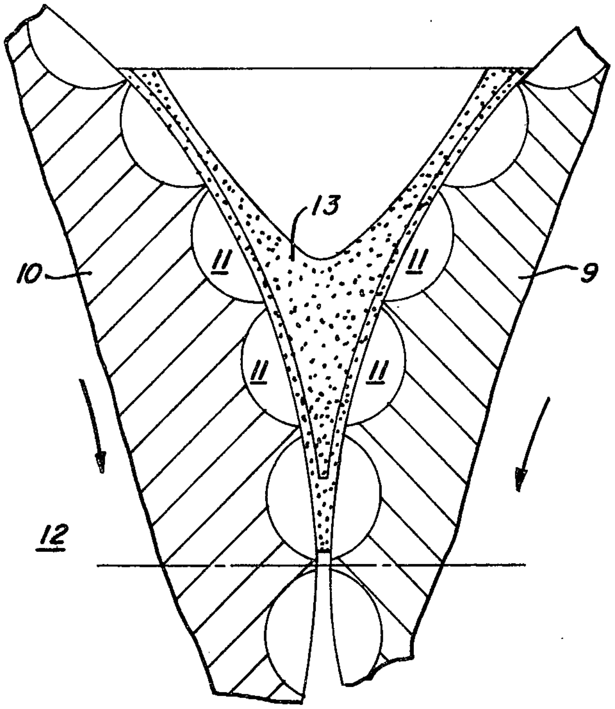
FIG. 4 is a vertical section view of the mounted roll segments with the cheekplate in position.

Referring to FIG. 1, the face of a conventional segment typically has several whole mold pockets or cavities 1, several half-pockets 2, land areas 3 separating the pockets, and side or ledge areas 4.

As shown in FIG. 1, the flow of excess partially reduced powder during the briquetting operation will be toward the uppermost portion of the cavity since that portion of the cavity is the last to undergo compaction.

FIG. 2 shows a section of a segment as it would appear near the nip of the rolls, i.e., when it is almost contacting another opposing segment on the opposite roll. The base area 5 of the segment fits into a recess in the star wheel usually forming the roll. The flow of "excess" powder in the conventional configuration is vertical. This phenomenon has been confirmed by the fact that densities, determined from sectioned briquettes produced with this design, were slightly greater in the upper half of the briquettes.

Figure 3:
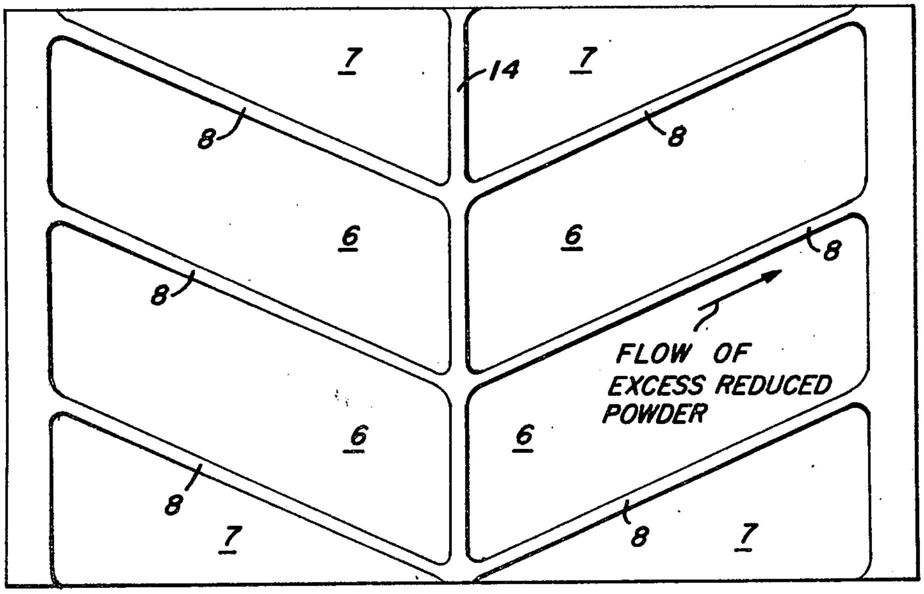
FIG. 3 is a face view of a briquette roll segment constructed in accordance with our invention.

FIG. 3 is a top or face plan view of our segment showing the parallelogram or rhomboid shape of our pockets. Whole pockets 6 and half pockets 7 are designed in a V-shape, as outlined by V-shaped land areas 8 with respect to central land area 14. As indicated, the partially reduced powder tends to flow in a path parallel to the ascending land areas, thus distributing it in a more even density in the entire volume of the pocket.

FIG. 4 is a more or less diagrammatic side view of a tandem briquette roll machine. It shows rolls 9 and 10 having peripheral mold pockets 11 (in segments not illustrated) mating at area 12 near the nip of the rolls, and cheekplate 13 designed to retain material such as reduced iron ore powder between the rolls. A screw feeder or other feeding device is placed directly above this assembly to force the powder into the nip of the rolls. Because of the poor flow near the cheekplates and powder loss which occurs in the space between the cheekplate 13 and the pockets 11, densities of the briquettes in this area are lower than in other areas of the briquette. Rolls 9 and 10 may be star wheels or any other device capable of holding pocket segments.

Our invention utilizes the flow of reduced powder described in such a manner that excess reduced powder will be directed to the side portion of the cavity rather than the center or top portion. In effect, the side portion of the cavity, i.e., that nearest the cheekplate, is provided with sufficient reduced powder to replace that which is lost through cheekplate leakage and to evenly distribute the pressure on the powder. The delay in compacting of the reduced powder at the side portion of the cavity provided by this design will thus ensure that sufficient time is provided for flow of excess reduced powder from the lower portion of the cavity. It is the placement of the cavity at an inclined angle to the horizontal, i.e., the "herringbone" design, which provides this change of powder flow during the briquetting step. This same operation is repeated as each cavity in the circumferential face of the briquetting roll rotates downward into the briquetting zone.

From the foregoing description, it is seen that our invention affords a simple, effective means of achieving relatively uniform density in briquettes, by creating an upward and outward flow pattern of partially reduced iron ore powder within the briquette roll cavity through the use of mold pockets in a herringbone configuration.

The angles of the V's may vary from about 10° to about 30°. Land areas are generally about one-eighth inch wide; depending on the dimensions of the overall machine, land areas of one-sixteenth to one-fourth inch may be desirable. For best results on reduced iron ore, the pockets should have depths at their deepest points of about 0.350 to 0.475 inch. We have found that four whole pockets and four half-pockets form a convenient pattern compatible with commercial segment shapes for placement on currently commercial star wheels. Other configurations may be used, but the most efficient design will minimize the frequency of segment abutments cut diagonally through the pockets. A plurality of pockets should be formed with a symmetrical V-shaped design.

Persons skilled in the art may recognize that conventional segment design may not be essential; our invention includes a method of making briquettes comprising feeding particulate material such as reduced iron ore into the nip of two tangential rolls having mating peripheral mold pockets, said pockets being disposed in a V-formation extending from a central land area and compacting said ore in the pockets between said rolls.

We do not intend to be restricted to the particular embodiments used for illustrtion herein. Our invention may be otherwise variously practiced within the scope of the following claims.

We claim:

1. In a method of making iron ore briquettes by compressing reduced particulate ore in mating cavities in the nip between pairs of rotating tangential rolls, the improvement comprising:

compressing said ore in the nip between a pair of rolls having generally rhomboid mating cavities in their peripheral surfaces, each of said cavities on a roll being separated from at least one other cavity along the roll length by a central raised land, said cavities having a generally herringbone configuration on the roll surface, and causing a portion of said ore to be directed, within said cavities, upwardly with respect to said nip and generally outwardly with respect to said land, thereby achieving even distribution of said ore throughout said cavities.

* * * * *